INVENTOR.
Robert M. Buchwald
BY
Robert J. Outland
ATTORNEY

INVENTOR.
Robert M. Buchwald
BY
Robert J. Outland
ATTORNEY

Oct. 21, 1969　　　R. M. BUCHWALD　　　3,473,399
BELT DRIVE AND TENSIONING MEANS

Original Filed July 3, 1967　　　　　4 Sheets-Sheet 3

INVENTOR.
Robert M. Buchwald
BY
Robert J. Outland
ATTORNEY

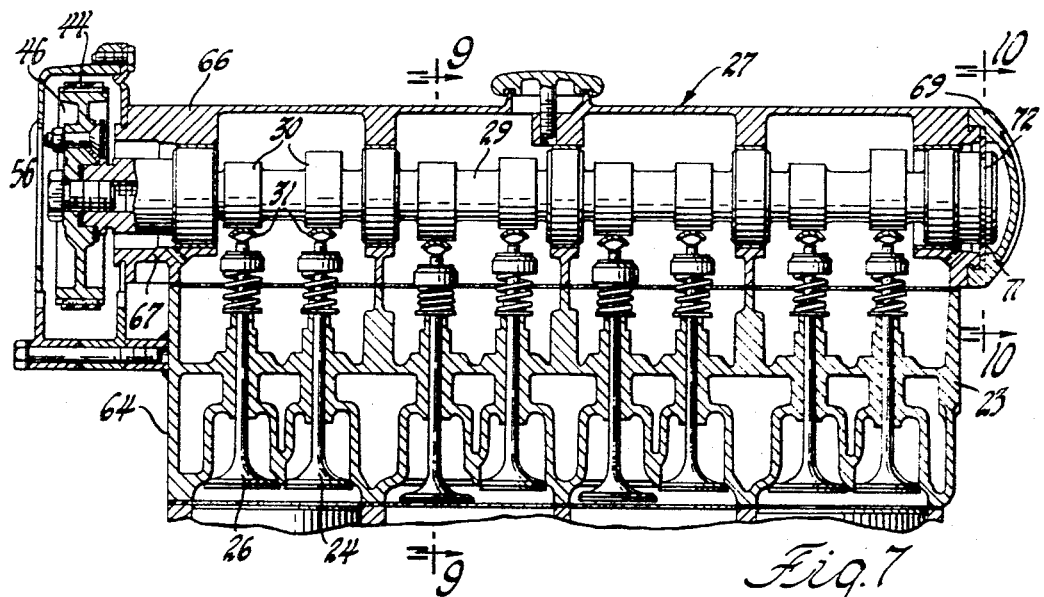
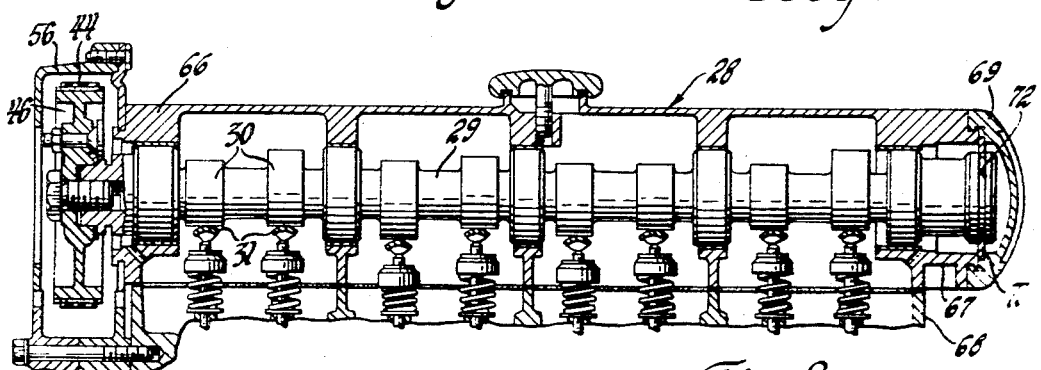
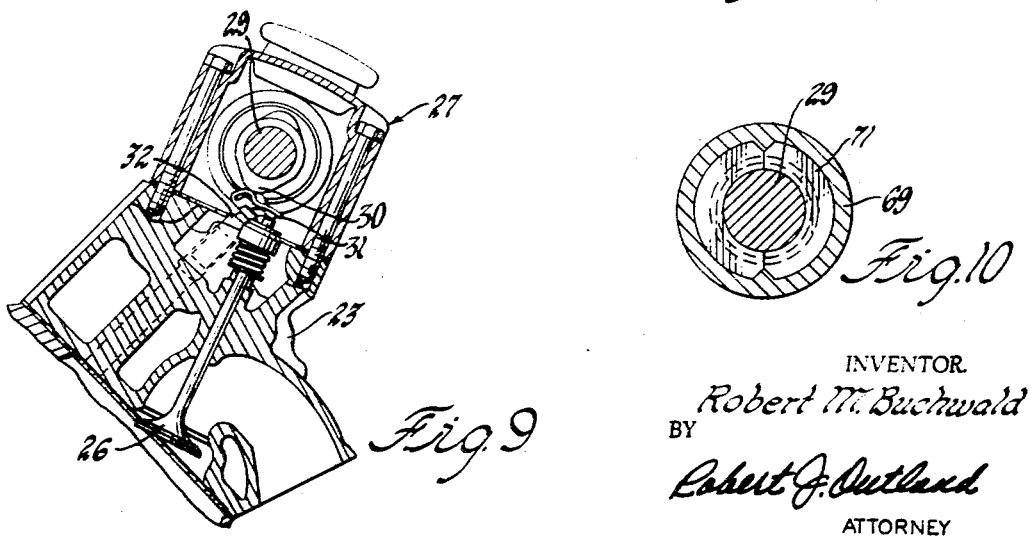

United States Patent Office 3,473,399
Patented Oct. 21, 1969

3,473,399
BELT DRIVE AND TENSIONING MEANS
Robert M. Buchwald, Birmingham, Mich., assignor to General Motors Corporation, Detroit, Mich., a corporation of Delaware
Original application July 3, 1967, Ser. No. 650,974. Divided and this application Sept. 13, 1968, Ser. No. 759,695
Int. Cl. F16h 7/12
U.S. Cl. 74—226                                 6 Claims

ABSTRACT OF THE DISCLOSURE

A V-type internal combustion engine includes overhead camshafts carried in interchangeably reversible cylinder head covers and driven from the crankshaft through an intermediate shaft centrally mounted above the crankshaft in the position commonly occupied by the camshaft of conventional push rod type overhead valve engines. The intermediate shaft is driven from the crankshaft through a front-mounted chain drive and in turn drives the camshafts through a rear-mounted cog belt drive. The cog belt drive includes novel belt tensioning means which utilize three pulleys that are radially adjustable with respect to a central axis and move together to equalize tension adjustments of the three belt runs. The pulleys are arranged to provide maximum wraparound of the cog belts in relation to the drive and driven pulleys of the drive arrangement.

---

This is a division of United States Ser. No. 650,974, filed July 3, 1967.

This invention relates to internal combustion engines and more particularly to an arrangement for an engine of the overhead camshaft type having novel means for driving and supporting the engine camshafts. In its more particular aspects, the invention contemplates an engine having the following features:

(1) A camshaft drive arrangement wherein the crankshaft drives an intermediate shaft through a front-mounted chain drive and the intermediate shaft extends the length of the engine and drives the camshafts through a rear-mounted cog belt drive or the like;

(2) A camshaft drive belt tensioning arrangement for use with the camshaft drive of vee-type engines and the like; and (3) Interchangeable camshaft supporting cylinder head covers arranged for reversible use on either bank of an overhead camshaft vee-type engine.

As the demand increases for higher horsepower outputs from automotive engines for various applications, it is natural for automotive engineers to consider the use of overhead camshaft arrangements which offer the advantage of reduced valve train inertia thereby permitting satisfactory engine operation at higher speeds and resulting in the ability to obtain higher horsepower output than conventional slower running engines of the same size; for example, of the type having conventional push rod and rocker arm valve gear. In view, however, of the lower cost of components for the conventional push rod type construction in which the cam shaft is mounted in the engine block and the large production and satisfactory usage of such engines in many applications, it is desirable to design higher output overhead camshaft engines to utilize, to the greatest degree possible, the parts and production tooling available for use in and for the manufacture of the conventional engines. At the same time, an overhead camshaft arrangement must be adequate for the drive requirements of the engine overhead camshafts and should, at the same time, be arranged for efficient and compact installation in engine compartments of limited space and predetermined shape, such as conventional vehicle engine compartments. Furthermore, the cost of such a design will be reduced if the number of special parts required is held to a minimum by the use of dual purpose components for similar applications.

The present invention meets these requirements by the provision of an overhead camshaft engine adapted from a conventional engine design and arranged to use a cylinder block sufficiently similar to that of a conventional overhead valve engine that it may be machined from the same casting and utilize substantially the same tooling as the conventional engine block. Additionally, while special cylinder heads and camshaft carrying covers are required, these are both arranged as interchangeable units to be utilized on either bank of the engine. Due to the normal offset of the cylinder banks and the required alignment of drive pulleys for the overhead camshafts, the reversibility of the camshaft carrying covers requires provision of a special extension portion which extends oppositely on the two banks so as to bring the ends into transverse alignment. In addition, the practical design of a suitable belt drive includes a novel tension adjusting arrangement which permits maximum power transmission through the belt by providing contact of the belt with the driving and driven pulleys of greater than 180° each to prevent slipping at high loads and at the same time provides equal adjustment of all three legs of the triangular belt arrangement at the same time.

These and other advantages of the present invention will be more clearly understood from the following description of a preferred embodiment of the invention selected for purposes of illustration and referring to the drawings wherein:

FIGURE 7 is a cross-sectional view of the right bank cylinder head and cover assembly taken generally in the plane indicated by the line 7—7 of FIGURE 3;

FIGURE 8 is a cross-sectional view of the left bank cylinder head and cover assembly taken generally in the plane indicated by the line 8—8 of FIGURE 3;

FIGURE 9 is a transverse cross-sectional view of the right bank cylinder head and cover assembly taken generally in the plane indicated by the line 9—9 of FIGURE 7; and FIGURE 10 is a cross-sectional view showing the camshaft thrust locking means taken generally in the plane indicated by the line 10—10 of FIGURE 7.

Figure 1:
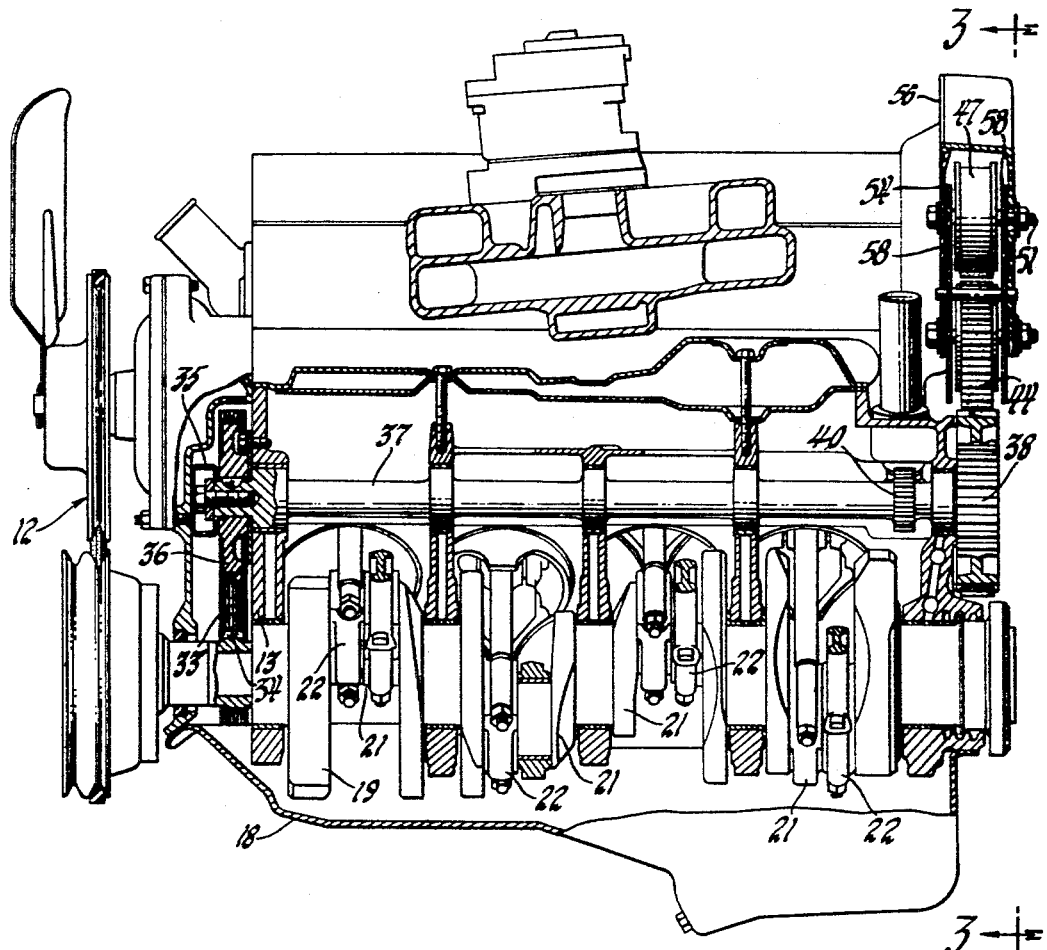
FIGURE 1 is a cross-sectional view of a V-type internal combustion engine having an overhead camshaft arrangement according in to the invention.
Figure 2:
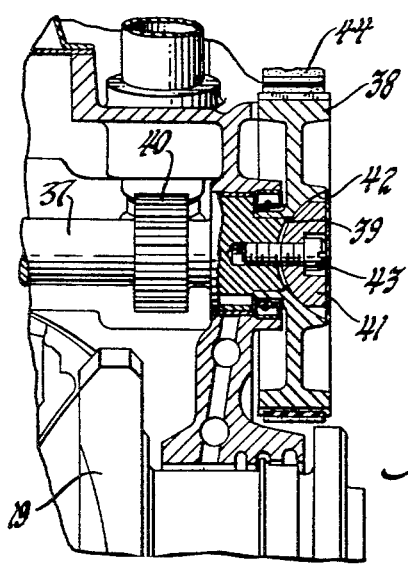
FIGURE 2 is a fragmentary cross-sectional view of the engine of FIGURE 1 showing one type of drive pulley mounting arrangement.
Figure 3:
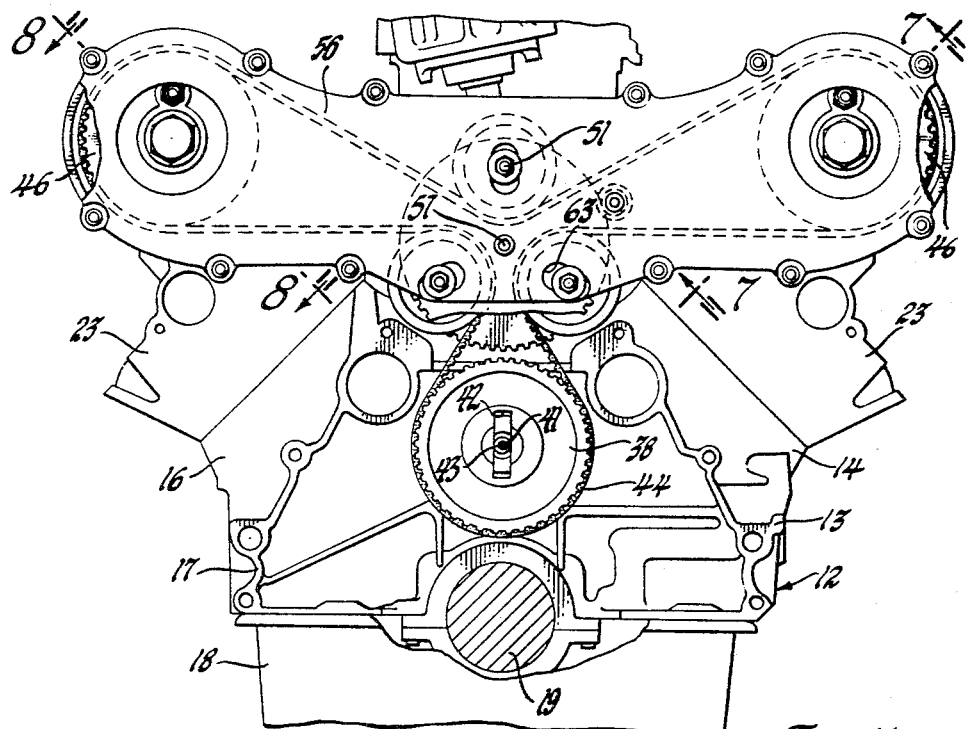
FIGURE 3 is a rear end view of the engine of FIGURE 1 looking in the direction indicated by the arrows 3—3 of FIGURE 1.
Figure 4:
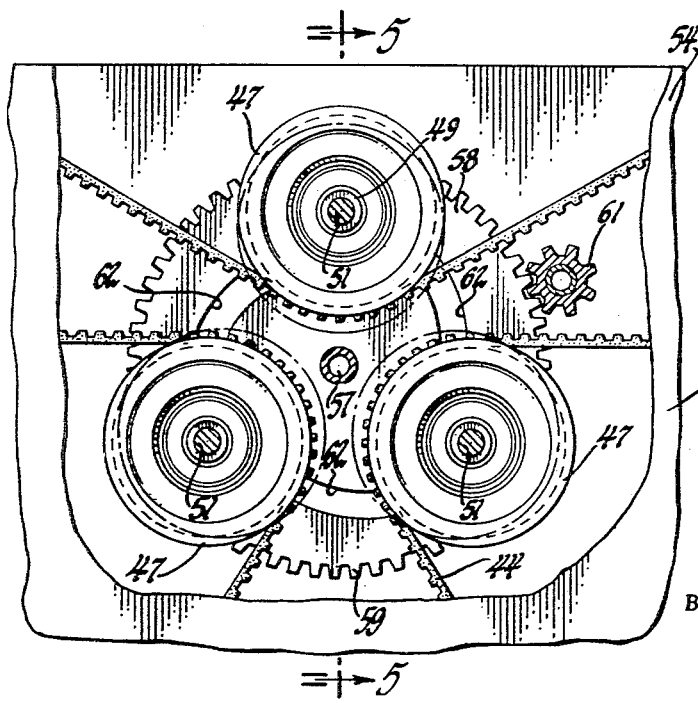
FIGURE 4 is an enlarged view of a portion of FIGURE 3 partially broken away to disclose components of the belt tightening means.
Figure 5:
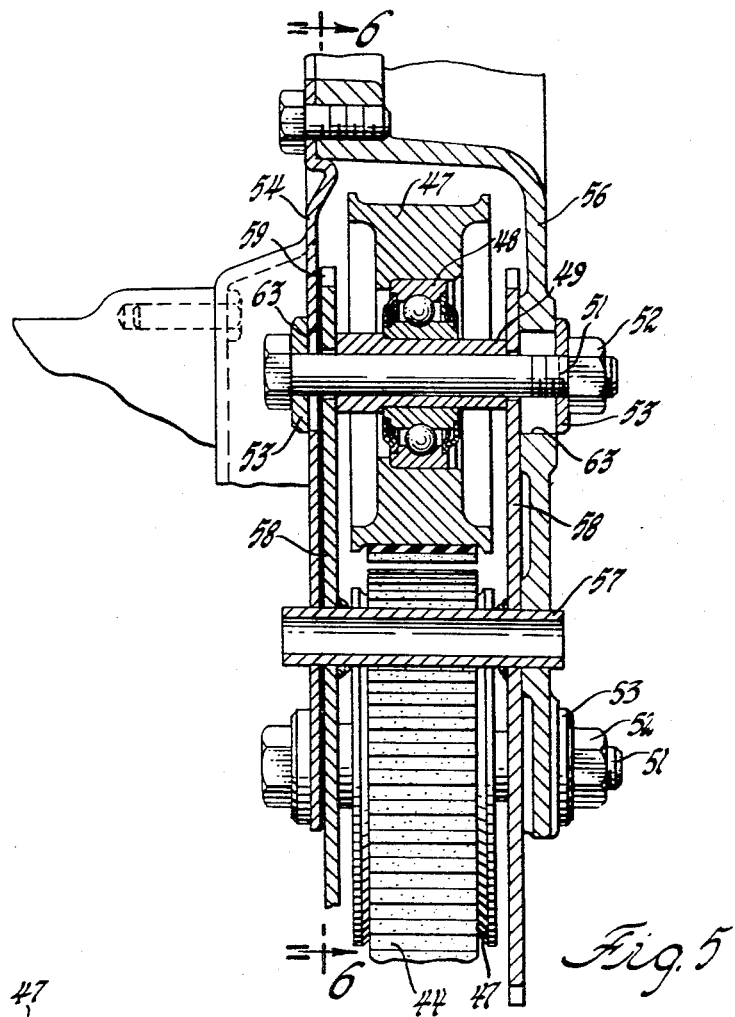
FIGURE 5 is a cross-sectional view taken generally in the plane indicated by the line 5—5 of FIGURE 4.
Figure 6:
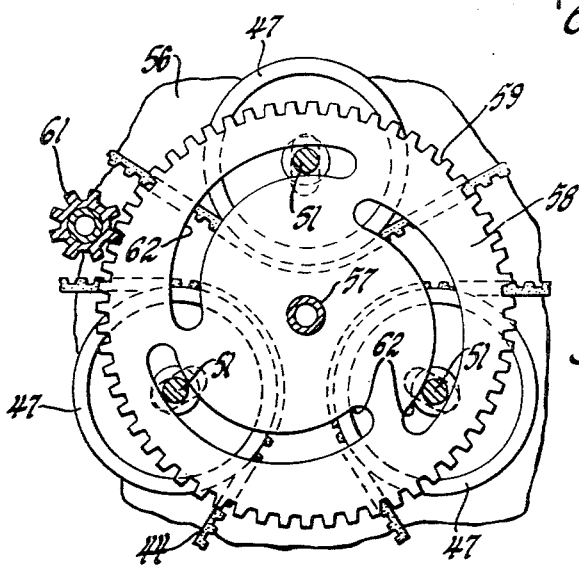
FIGURE 6 is an interior view of the tensioner adjusting means taken generally in the plane indicated by the line 6—6 of FIGURE 5.

Referring with more particularity to the drawings, numeral 12 generally indicates an internal combustion engine having a cylinder block 13 including a pair of angularly disposed banks of cylinders 14 and 16 joined at their lower ends by an integrally formed crankcase portion 17 which forms a crankcase cavity closed by a conventional oil pan 18. Rotatably journaled against the lower portion of the block is a crankshaft 19 having a plurality of throws 21 on which are received pairs of connecting rods 22 alternately connected with pistons in the right and left bank cylinders respectively in the usual manner. Mounted on the upper ends of the cylinder block are cylinder heads 23 carrying aligned pairs of inlet and exhaust valves 24 and 26 respectively which control the flow of fluids to and from the engine cylinders in a conventional manner.

Secured on upper surfaces of the cylinder heads are right and left cover assemblies generally indicated by numerals 27 and 28 respectively. Cover assemblies 27 and 28 rotatably journal overhead camshafts 39 which carry cams 30. The cams 30 engage rocker arms 31 which pivot about hydraulic lash adjusting supports 32 carried by the cylinder heads and engage the stems of valves 24, 26 for actuating the valves in a known manner.

Camshaft drive arrangement

In order to provide for driving the overhead camshafts from the crankshaft, a novel camshaft drive arrangement is provided. The drive includes a chain 33 extending between a front-mounted crankshaft sprocket 34 and a driven sprocket 36 carried on the front end of a longitudinally extending shaft 37 and supporting a fuel pump drive eccentric 35. Shaft 37 is carried in bearings located centrally of the engine block in the position in which the camshaft of a conventional push rod type overhead valve engine is usually located and shaft 37 may replace such a camshaft in a substantially conventional cylinder block.

The shaft 37 extends longitudinally through the cylinder block and carries at its rear end distribution drive means 40 and a drive pulley 38 which is secured to a slotted end portion 39 of the shaft by a segmental key 41 retained in an annular recess 42 of the pulley by a screw 43. Pulley 38 drives a cog type belt 44 which engages the outer surface of the pulley and in turn the outer surfaces of driven pulleys 46 carried on the rear ends of the overhead camshafts 29 and drivingly secured thereto.

Thus, the camshaft drive takes advantage of the central shaft provision of conventional cylinder blocks to permit a drive from the front of the camshaft to the intermediate shaft 37 and from the rear of shaft 37 to the rear of the camshafts 29. This has the advantage of moving the excess height caused by the driven pulleys of the overhead camshaft drive to the rear of the engine which, due to the backwardly tilted mounting which is conventional in automotive vehicles, permits the front of the engine to be kept as low as possible and thus allows mounting of the engine with a lower vehicle hood line than would otherwise be possible. In addition, the arrangement leaves free the rear end of the crankshaft from drive pulleys or sprockets which might otherwise extend the length or require additional bearing support at the connection of the engine to the usual transmission or other driven component.

Belt tensioning means

Experience with overhead camshaft drives, particularly those with cog belts, shows that the greatest loads can be transmitted if the belt is wrapped around the drive and driven pulleys as far as possible so that the greatest number of belt and pulley teeth are in engagement at all times. The high tensile strength of belts in current use permits the transmission of extremely high loads. These loads have been found to be limited in part by the forces acting on the individual belt teeth which for design reasons are made relatively shallow. Thus, if the individual tooth forces are too high, the belt may stretch slightly permitting the teeth to slip with resulting mistiming of the driving and driven shafts.

This problem is overcome with the instant invention by the provision of unique belt tensioning means which comprise three equiangularly disposed pulleys 47 carried within the triangular space formed by drive pulley 38 and driven pulleys 46, one pulley 47 engaging each of the lengths of belt 44 extending between two of the adjacent pulleys 38, 46. Pulleys 47 are rotatably carried on ball bearings 48 which are in turn carried by sleeves 49 on bolts 51, the bolts 51 are locked by nuts 52 and washers 53 to inner and outer cover members 54 and 56 respectively which form a housing covering the upper portions of the camshaft drive arrangement.

Centrally located between the pulleys and extending through cover members 54 and 56 is a tubular member 57 to which are welded a pair of plates 58 having toothed peripheries 59. The toothed peripheries engage the mating teeth of a gear wheel 61 which is also carried by cover members 54 and 56 and includes means (not shown) by which it may be engaged by a suitable manual tool and turned in order to rotate the plates 58 and tubular member 57 within the cover assembly. Both plates 58 also include three spiral slots 62 through which bolts 51 project. In addition, bolts 51 extend through slots 63 in cover members 54 and 56, the slots extending radially of central tubular member 57.

Adjustment of belt tension is accomplished by manual rotation of gear 61 by a suitable tool which in turn rotates plates 58 causing the edges of spiral grooves 62 to force bolts 51 inwardly or outwardly as the case may be within housing slots 63. When adjustment is complete, nuts 52 are tightened to fix the position of the pulleys on the cover members 54 and 56. With this arrangement, all three pulleys 47 are moved simultaneously so that belt stretch is taken up on all three legs of the triangular pulley drive at the same time thereby retaining the same relative timing between the pulleys under all belt length conditions. In addition, the positioning of the adjuster within the triangular limits of the three pulleys permits a maximum wrap around of the belt with respect to each of the pulleys, the wrap around being substantially greater than 180° in each case. Thus the maximum possible force may be transmitted through a particular size of cog belt.

Cylinder head cover reversibility

As was previously mentioned, cylinder banks 14 and 16 are longitudinally offset due to the staggering of right and left bank connecting rods on the same crankshaft journals. As is common practice, the cylinder heads 23 mate with the cylinder banks and thus provide offset rear surfaces. In order, however, that the driven pulleys 46 of camshaft 29 may be aligned and the cover assembly formed by members 54, 56 may be efficiently supported, aligned support surfaces are necessary; thus, right and left cover assemblies 27 and 28 are arranged to provide the necessary mounting surfaces.

For this reason, right bank assembly 27 includes a portion extending beyond the rear wall 64 of the cylinder head. In order to utilize the same cover member 66 on both banks, an extension 67 is provided on member 66 which extends rearwardly of rear wall 64 of the right bank. When the cover is utilized on the left bank, it is reversed so that the extension extends forwardly of front wall 68. The opposite ends of member 66 are machined in an identical manner so as to alternately receive the components of cover assembly 54 and 56 at their rear ends and separate cap members 69 at their front ends. Split retainers 71, held by the cap members, engage grooves 72 in the respective camshafts to prevent longitudinal movement of the shafts.

I claim:
1. Camshaft drive means for a V-type overhead camshaft engine, said means comprising
   a toothed drive pulley,
   a pair of toothed driven pulleys coplanar with said drive pulley and forming a triangular pattern therewith, a toothed belt drivingly connecting in positive fashion said drive and driven pulleys, and three idler pulleys coplanar with said drive and driven pulleys and annularly spaced in close proximity around an axis centrally disposed within said triangular pattern, said idler pulleys engaging the belt runs between all the pairs of toothed pulleys and displacing said runs inwardly to points proximate said centrally disposed axis whereby said belt is maintained in engagement with substantially more than half the toothed circumference of each of said toothed pulleys.

2. Camshaft drive means as defined in claim 1 and including means for moving said idler pulleys radially with respect to said centrally disposed axis to adjust the tension on said belt.

3. Camshaft drive means as defined in claim 2 and including means for equalizing radial movement of said idler pulleys whereby tension adjustments of said belt are made equally on all the belt runs.

4. Camshaft drive means as defined in claim 1 wherein said idler pulleys comprise belt tensioning means including axle means rotatably supporting each said idler pulley, radial guide means cooperating with said axle means to limit movement thereof to directions radial of said centrally disposed axis, and adjusting plate means rotatable around said centrally disposed axis, said plate means including spiral groove means engaged by said axle means to cause simultaneous radial adjustment of said three idler pulleys upon rotation of said adjusting plate means.

5. The combination of claim 4 wherein said adjusting plate means include a toothed periphery and a toothed gear arranged to be manually actuated and rotatably supported in engagement with said toothed periphery to provide for rotational adjustment of said adjusting plate means.

6. The combination of claim 5 wherein said axle means include threaded locking means arranged to secure said axle means in any desired position within said radial guide means to prevent unintentional movement of said pulleys from a predetermined position.

References Cited

UNITED STATES PATENTS

| | | |
|---|---|---|
| 2,106,918 | 2/1938 | Perazzoli. |
| 2,258,465 | 10/1941 | Mullaney. |
| 2,831,359 | 4/1958 | Carle. |
| 2,894,405 | 7/1959 | Carle _____ 74—242.14 XR |
| 2,900,831 | 8/1959 | Wilson et al. |

FRED C. MATTERN, Jr., Primary Examiner

JAMES A. WONG, Assistant Examiner

U.S. Cl. X.R.

74—242.1